US007570561B2

(12) United States Patent
Tai

(10) Patent No.: US 7,570,561 B2

(45) Date of Patent: Aug. 4, 2009

(54) METHOD FOR DETERMINING TYPE OF DIGITAL VERSATILE DISCS

(76) Inventor: Bryan Tai, 8F, No. 533, Chung-Cheng Rd., Hsin-Tien City, Taipei Hsien (TW)

( * ) Notice: Subject to any disclaimer, the term of this patent is extended or adjusted under 35 U.S.C. 154(b) by 609 days.

(21) Appl. No.: 11/078,221

(22) Filed: Mar. 9, 2005

(65) Prior Publication Data

US 2005/0265189 A1 Dec. 1, 2005

Related U.S. Application Data

(60) Provisional application No. 60/574,665, filed on May 25, 2004.

(30) Foreign Application Priority Data

Dec. 8, 2004 (TW) .............................. 93137921 A

(51) Int. Cl.
*G11B 27/36* (2006.01)

(52) U.S. Cl. ................................ 369/53.23; 369/53.22

(58) Field of Classification Search ................ 369/53.2, 369/53.23, 53.22
See application file for complete search history.

(56) References Cited

U.S. PATENT DOCUMENTS 5,381,392 A 1/1995 Hira
5,506,824 A 4/1996 Fairchild et al.
5,724,325 A 3/1998 Jeong
5,745,460 A 4/1998 Tateishi
5,764,610 A 6/1998 Yoshida et al.
5,831,952 A 11/1998 Yamada et al.
5,903,531 A * 5/1999 Satoh et al. .............. 369/44.29
5,959,955 A 9/1999 Choi
6,005,832 A 12/1999 Kumagai et al.
6,052,344 A 4/2000 Ueki
6,212,141 B1 * 4/2001 Tanikawa ................. 369/47.31
6,249,499 B1 6/2001 Andoh
6,295,260 B1 9/2001 Shihara et al.

(Continued)

FOREIGN PATENT DOCUMENTS

BR PI0418819 11/2007

(Continued)

OTHER PUBLICATIONS

Search and Examination Report for GB Application No. 0324645.0, Mail Date Nov. 22, 2004, 8 pages.

(Continued)

*Primary Examiner*—Thang V Tran
(74) *Attorney, Agent, or Firm*—Perkins Coie LLP

(57) ABSTRACT

A method for determining the type of digital versatile discs (DVDs) is provided, for distinguishing among a read only memory (ROM) DVD, a recordable DVD and a re-writable DVD. The method includes reading a tracking error signal from a DVD. If the amplitude of the tracking error signal is greater than a first predetermined value, the DVD is a recordable DVD; otherwise, a recorded area (RECD) signal is read from the DVD. If the RECD signal is zero, the DVD is a blank re-writable DVD; otherwise, a total RF level signal is read from the DVD. If the total RF level signal is greater than a second predetermined value, the DVD is a DVD ROM; otherwise, the DVD is a re-writable DVD with data.

14 Claims, 3 Drawing Sheets

U.S. PATENT DOCUMENTS

| | | | | |
|---|---|---|---|---|
| 6,449,232 | B1 | 9/2002 | Kuwahara et al. | |
| 6,459,666 | B1 | 10/2002 | Yokoi | |
| 6,603,720 | B1 | 8/2003 | Kuroda et al. | |
| 6,700,847 | B2 | 3/2004 | Osada | |
| 6,728,181 | B2 * | 4/2004 | Shimoda et al. | 369/53.2 |
| 6,747,931 | B1 * | 6/2004 | Park | 369/53.23 |
| 6,760,289 | B1 | 7/2004 | Ide | |
| 6,807,136 | B1 | 10/2004 | Grimm | |
| 6,816,443 | B1 * | 11/2004 | Hwang | 369/44.32 |
| 6,822,936 | B2 * | 11/2004 | Ono et al. | 369/53.23 |
| 6,856,586 | B2 | 2/2005 | Usui et al. | |
| 6,909,678 | B2 | 6/2005 | Morishima | |
| 6,925,039 | B2 | 8/2005 | Yanagawa et al. | |
| 6,980,500 | B2 | 12/2005 | Lu et al. | |
| 6,992,961 | B2 | 1/2006 | Minase et al. | |
| 7,016,284 | B2 | 3/2006 | Chou | |
| 7,046,593 | B2 | 5/2006 | Ito | |
| 7,099,253 | B2 * | 8/2006 | Hsu et al. | 369/53.23 |
| 2002/0075780 | A1 | 6/2002 | Ogihara | |
| 2002/0126607 | A1 | 9/2002 | Yamamoto et al. | |
| 2004/0081049 | A1 | 4/2004 | Chan | |
| 2004/0218497 | A1 | 11/2004 | Choi et al. | |
| 2005/0047300 | A1 | 3/2005 | Ono et al. | |
| 2005/0058036 | A1 | 3/2005 | Chen et al. | |
| 2005/0226114 | A1 | 10/2005 | Liow et al. | |
| 2005/0265187 | A1 | 12/2005 | Chang et al. | |
| 2005/0265188 | A1 | 12/2005 | Chang et al. | |
| 2006/0198268 | A1 | 9/2006 | Chan | |

FOREIGN PATENT DOCUMENTS

| | | |
|---|---|---|
| BR | PI0418821 | 11/2007 |
| CN | 1348181 | 5/2002 |
| CN | 1366660 | 8/2002 |
| CN | 1490790 | 4/2004 |
| CN | 1591643 | 3/2005 |
| CN | 1601639 | 3/2005 |
| CN | 1637909 | 7/2005 |
| CN | 1658312 | 8/2005 |
| CN | 1700311 | 11/2005 |
| EP | 0725395 | 11/1996 |
| EP | 0784321 | 7/1997 |
| EP | 0811971 | 12/1997 |
| EP | 0813192 | 12/1997 |
| EP | 0903735 | 3/1999 |
| GB | 2394596 | 4/2004 |
| JP | 10-302381 | 11/1998 |
| JP | 2000-078392 | 3/2000 |
| JP | 2000-322742 | 11/2000 |
| JP | 2001126376 | 5/2001 |
| JP | 2001167510 | 6/2001 |
| JP | 2001265620 | 9/2001 |
| JP | 2002007156 | 1/2002 |
| JP | 2002119830 | 4/2002 |
| JP | 2003-16441 | 1/2003 |
| JP | 2003-217135 | 7/2003 |
| JP | 2002-312933 | 10/2005 |
| TW | 200511273 | 3/2005 |
| TW | 253060 | 4/2006 |
| WO | WO 03005350 | 1/2003 |
| WO | WO-2005117009 | 12/2005 |
| WO | WO-2005117008 | 12/2008 |

OTHER PUBLICATIONS

Search and Examination Report for GB Application No. 0324645.1, Mail Date Feb. 9, 2004, 1 pages.

German Search Report for German Application No. 10349161.9, Mail Date Nov. 17, 2004, 4 pages.

* cited by examiner

METHOD FOR DETERMINING TYPE OF DIGITAL VERSATILE DISCS

CROSS-REFERENCE TO RELATED APPLICATION

This application claims the priority benefits of U.S. provisional application titled "NEW METHOD OF IDENTIFYING ROM/R/RW TYPE OF DVD DISC (USING TE SIGNAL, RECD SIGNAL AND RFLVL SIGNAL)" filed on May 25, 2004, Ser. No. 60/574,665. All disclosure of this application is incorporated herein by reference. This application also claims the priority benefit of Taiwan application serial no. 93137921, filed on Dec. 8, 2004.

BACKGROUND OF THE INVENTION

1. Field of the Invention

The present invention relates to a method for determining the type of digital versatile discs (DVD). More particularly, the present invention relates to a method for distinguishing among a DVD read-only-memory (ROM), a recordable DVD and a re-writable DVD.

2. Description of the Related Art

Digital versatile discs (DVD) have already become one of the most common data storage media in most electronic devices. Originally, the DVDs are used for recording videos. Gradually, however, DVDs begin to save other forms of data such as computer programs and files in a personal computer. Since the conventional read-only disc cannot copy the programs and files, various types of recordable digital versatile discs have been developed. The most common types of DVD include:

1. DVD ROM (read only memory). In other words, this type of optical disc only reads but cannot record data.
2. Recordable DVD, which is categorized into DVD-R and DVD+R. Herein, R stands for "recordable." As the name suggests, this type of optical disc can record data for one time.
3. Re-writable DVD, which is categorized into DVD-RW and DVD+RW. RW stands for "re-writable." This type of optical disc can record data for multiple times and hence is the most convenient recording medium.

facilitate the users, DVD manufacturers have introduced optical disc players that are compatible with all kinds of digital versatile discs. However, each type of DVD has different data reading and writing method. Hence, the first thing the DVD player has to do after an optical disc is inserted is to determine the type of the DVD. In other words, the DVD must be distinguished as a ROM DVD, a recordable DVD or a re-writable DVD.

Conventionally, the type of DVDs is determined in two stages. In the first stage, the amplitude of a focus error signal is used to distinguish between a re-writable DVD from a non-re-writable DVD. The focus error signal is produced, for example, by turning on the laser beam of the DVD player and then driving the pick-up head (PUIH) to move up and down. The amplitude of the focus error signal is proportional to the reflectivity of the optical disc. Since the re-writable DVD has the lowest reflectivity, the characteristic of small amplitude in the focused error signal can be used to identify a re-writable DVD.

FIG. 1 is a graph showing the trace of a focus error signal. As shown in FIG. 1, the focus error signal is the curve marked as 101. The line 102 indicates a limit for the ROM DVD and the recordable DVD and the line 103 is a limit for the re-writable DVD. When the peak-to-peak voltage of the focus error signal is smaller than the limiting value 103 of the re-writable DVD, it is enough to determine that the optical disc inside the player is a re-writable DVD.

After distinguishing a re-writable DVD from a non-re-writable DVD, in the second stage of the conventional method, the characteristic land pre-pit information in a DVD-R and a DVD-RW optical disc and the characteristic address in pre-groove information in a DVD+R and DVD+RW are utilized to distinguish between a ROM DVD and a recordable DVD. Since the optical disc has already been determined as either a re-writable DVD or not in the first stage, this is no longer necessary in the second stage. Consequently, if the land pre-pit information or the address in pre-groove information can be read from the optical disc, the disc is a recordable DVD; otherwise, it is a ROM DVD.

FIG. 2 is a flow chart showing the steps in a conventional method for determining the type of DVDs. As shown in FIG. 2, a laser beam is turned on and then the pick-up head is driven to move up and down to generate a focus error signal in step 202. Thereafter, the largest and the smallest amplitude of the focus error signal are detected in step 204. The peak-to-peak voltage of the focused error signal is checked to determine whether the voltage is smaller than a limiting value indicating the absence of an optical disc. If the peak-to-peak voltage of the focused error signal is smaller than the limiting value, it is determined that an optical disc player is not inserted in step 208.

If the peak-to-peak voltage of the focused error signal is greater than or equal to the limiting value indicating the absence of an optical disc, the peak-to-peak voltage is again checked to determine if it is smaller than a limiting value for a re-writable DVD. If yes, it is determined that the optical disc inside the player is a re-writable DVD in step 212.

After distinguishing a re-writable DVD from a non-re-writable DVD, a calibration and a tracking operation are carried out in step 214 to prepare for a subsequent data reading operation. In step 216, the inserted optical disc is checked to determine whether pro-pit information or pro-groove information can be read or not. If yes, it is determined that the inserted optical disc is a recordable DVD in step 218; otherwise, the inserted optical disc is a ROM DVD.

The conventional method of determining the type of optical discs has many drawbacks. Firstly, when the quality of the pick-up head is poor, the quality of the read-out focused error signal would also degrade (for example, there may be a shift in the signal amplitude). As a result, the probability of determination error is increased. Secondly, re-writable DVDs having exceptionally high reflectivity or ROM DVDs or recordable DVDs having exceptionally low reflectivity are occasionally produced, rendering more determination error. Thirdly, when the land pro-pit information or the address in pro-groove information is difficult to read due to hardware or firmware problems, recordable DVDs or re-writable DVDs can be erroneously determined to be a ROM DVD. Fourthly, the step of reading the land pre-pit information and the address in pre-groove information is in the middle section of a servo-on process. Therefore, the ROM DVD is determined after many steps. Furthermore, after determining the type of optical discs, the servo-on process must be re-activated before data can be read from the optical discs. Consequently, a lot of time is wasted.

All in all, a better method must be provided to overcome the drawbacks of the conventional method of determining the type of optical discs, increase the accuracy of the determination and shorten the time for such determination.

SUMMARY OF THE INVENTION

Accordingly, the present invention provides a method of determining the type of digital versatile discs (DVDs) that can reduce the effect of any quality variation in optical disc and pick-up head and increase the accuracy of type determination. Furthermore, the method can shorten the time needed to determine a read only memory (ROM) DVD.

To achieve these and other advantages and in accordance with the purpose of the invention, as embodied and broadly described herein, one embodiment of the invention provides a method of determining the type of digital versatile disc (DVD), comprising the following steps. First, a tracking error signal is read from a DVD. If the amplitude of the tracking error signal is greater than a first predetermined value, the DVD is a recordable DVD; otherwise, a recorded area (RECD) signal is read. If the RECD signal is zero, the DVD is a blank re-writable DVD; otherwise, a total RF level signal is read. If the total RF level signal is greater than a second predetermined value, the DVD is a read-only-memory DVD; otherwise, the DVD is a re-writable DVD with data.

From another perspective, the present invention also provides another methods of determining the type of a digital versatile disc (DVD), comprising the following steps. According to a tracking error signal, it is determined whether the DVD is a recordable DVD or not. Thereafter, according to an RECD signal, it is determined whether the DVD is a blank re-writable DVD or not. Finally, according to a total RF level signal, it is determined whether the DVD is a re-writable DVD with data or a read-only-memory (ROM) DVD.

According to the aforementioned embodiments, the method of determining the type of DVDs used in the present invention differs from the conventional technique in that the signals used for determining the type of DVD is hardly affected by the actual quality of the optical disc and the optical pick-up head. Furthermore, unlike the prior techniques where tracking and calibrating take a lot of time, the present method is able to determine a ROM DVD in the beginning of a servo-on process. Consequently, the present invention not only overcomes the drawbacks of the conventional techniques and increase the determination accuracy, but can also significantly shorten the time to determine a ROM DVD.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
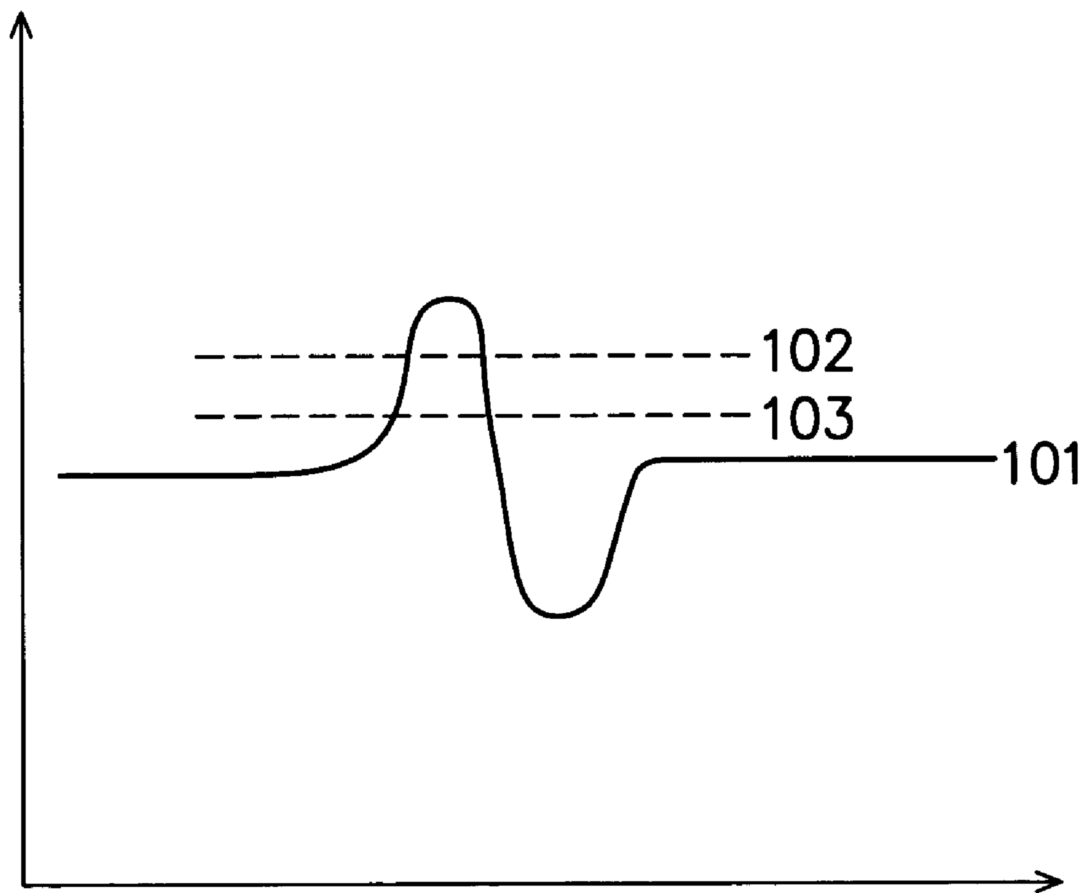
FIG. 1 is a graph showing the trace of a focus error signal.
Figure 2:
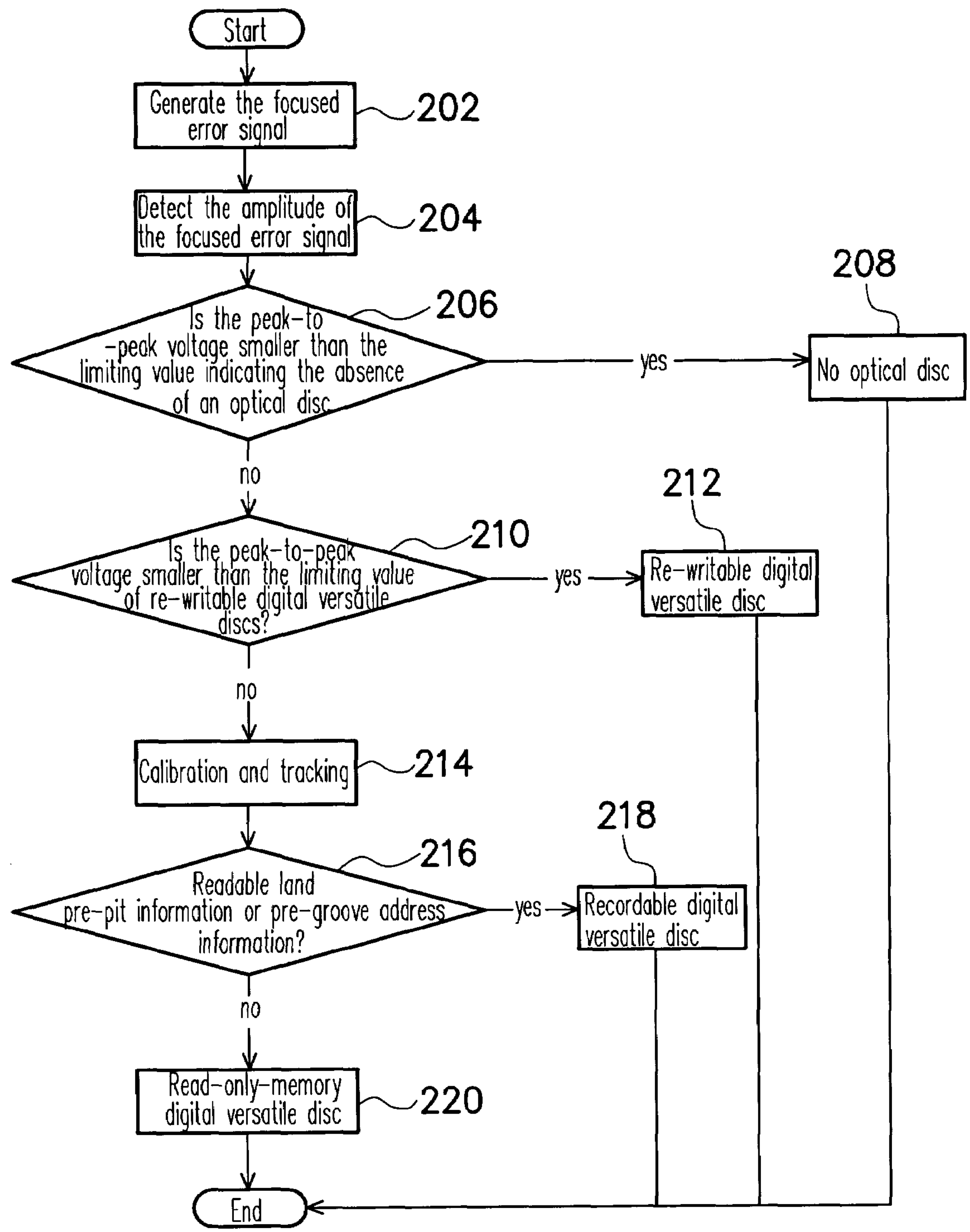
FIG. 2 is a flow chart showing the steps of a conventional method for determining the type of DVDs.

Reference will now be made in detail to the present embodiments of the invention, examples of which are illustrated in the accompanying drawings. Wherever possible, the same reference numbers are used in the drawings and the description to refer to the same or like parts.

The present invention provides a method of determining the type of digital versatile discs (DVDs). In the following embodiment, three separate stages are used to distinguish among read-only-memory (ROM) DVDs, recordable DVDs including DVD-R and DVD+R, and re-writable DVDs including DVD-RW and DVD+RW. In the following, these three stages are explained in detail.

In the first stage, the amplitude of the tracing error signal before locking to a particular track is used to identify a recordable DVD. The tracking error signal can be produced in two ways, including the preferred differential push-pull (DPP) method and the differential phase detection (DPD) method. In the differential push-pull method, the tracking error signal is computed according to the RF difference of the reflected beam read by the pick-up head above various regions. In the differential phase detection method, the tracking error signal is computed according to the phase difference of the reflected beam read by the pick-up head above various regions. Since the differential push-pull method and differential phase detection method are both conventional techniques, a detailed analysis is not described here.

According to the three types of DVD formats, the read-only-memory DVD has the smallest track pitch and the most circular tracks. Hence, the tracking error signal thus produced is the smallest. Because of the low reflectivity and the initial gain setting relation of a re-writable DVD, the tracking error signal thus generated is also very small. On the other hand, the tracking error signal of the recordable DVD is significantly larger than the other two. Therefore, a recordable DVD can be easily identified.

In the second stage of the present embodiment, a recorded area (RECD) signal is used to identify a blank re-writable DVD. Here, the RECD signal is a signal coming from the reflection of a laser beam of an optical disc. Because the presence or absence of data will change the characteristic of the portion of the optical disc containing stored data, the RF signal produced by an optical disc with data will be much greater than the RF signal produced by one without data. The amplitude of the RF signal obtained from the optical disc can be used to generate the RECD signal. If the value of the RF signal is greater than a predetermined value, the value of the RECD signal is set to 'high' or '1'; otherwise, the value of the RECD signal is set to 'low' or '0'. Hence, through the RECD signal, a blank re-writable DVD can be directly identified.

In the third stage of the present embodiment, the total RF level signal is utilized. In other words, the total reflection from an optical disc read by the pick-up head in various regions is used to identify between a read-only-memory DVD and a re-writable DVD with data. Because the process of burning data into a DVD will change the material properties on the surface of the DVD, the reflectivity of a burnt DVD differs from a blank DVD. Hence, the total RF level signal produced by a burnt re-writable DVD is significantly smaller than a ROM DVD. Thus, through the RF level signal, these two types of DVD can be easily distinguished. Here, the RF level signal is the sum (the sum of all the signals or the sum of a portion of signals) of the signals collected by the optical pick-up head.

Figure 3:
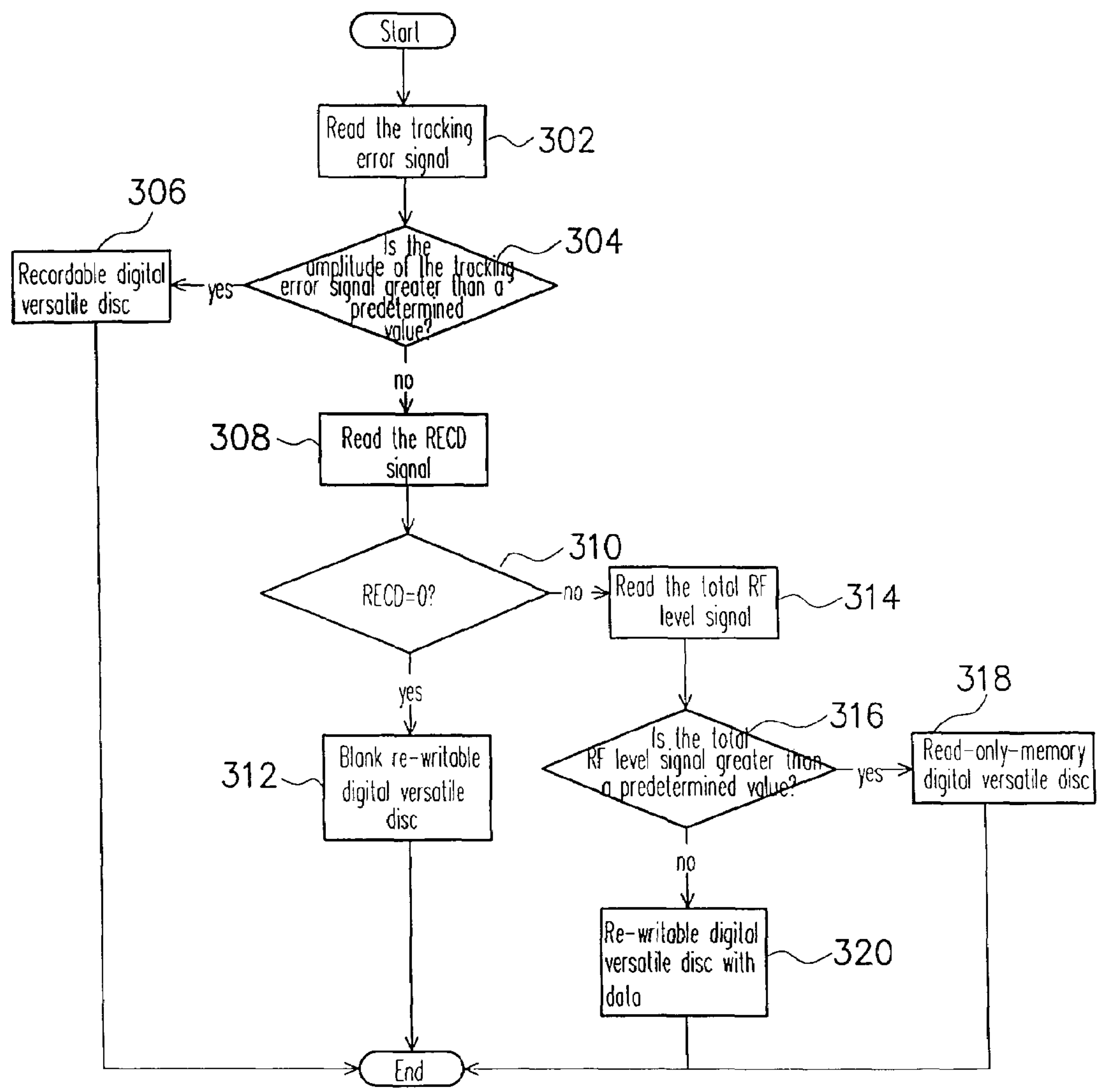
FIG. 3 is a flow chart showing the steps of a method for determining the type of DVDs according to an embodiment of the present invention.

FIG. 3 is a flow chart showing the steps in an actual embodiment for determining the DVD type according to the present invention. First, in step 302, tracking error signal necessary for determining the type of DVD is read from the DVD. Then, in step 304, it is determined whether the amplitude of the tracking error signal is greater than a predetermined value. If yes, the DVD is a recordable DVD in step 306. Starting from step 302 up to now, the aforesaid first stage is completed.

If the DVD is not a recordable DVD, the RECD signal is read from the DVD in step 308. Thereafter, the RECD signal is checked in step 310 to determine if it has the value zero. If the value of the RECD signal is zero, the DVD is a blank re-writable DVD in step 312. Starting from step 308 up to now, the aforesaid second stage is completed.

If the DVD is not a blank re-writable DVD, the total RF level signal is read from the DVD in step 314. Thereafter, in step 316, the total RF level signal is checked to determine if it is greater than another predetermined value. The predetermined value differs from that in step 304. If the total RF level signal is greater than the predetermined value, the DVD is a ROM DVD in step 318; otherwise, the DVD is a re-writable DVD with data therein in step 320. Starting from step 314 up to now, the aforesaid third stage is completed.

According to the aforementioned embodiment, the method of determining the type of DVD in the present invention differs from the prior techniques in that the tracking error signal, the RECD signal and the total RF level signal are utilized instead. These three types of signals are hardly affected by the quality of the optical disc and the optical pick-up head. Furthermore, the difference in signal amplitude for different types of DVD is significant and hence can be easily gauged. Moreover, unlike the conventional technique where land pre-pit information and address pre-groove information are relied and the signal reflected from the optical disc is analyzed, the signals used in the present invention is related to the amount of the laser beam reflected from the optical disc. Therefore, without having to spend time tracking and performing calibrations, the present invention is able to identify a ROM DVD at the very beginning of the servo-on process. Consequently, the present invention can avoid the drawbacks of the conventional technique and increase the accuracy of type determination. Additionally, the present invention also shortens the time for identifying a ROM DVD.

Although the aforementioned embodiment uses the tracking error signal, the RECD signal and the total RF level signal to determine the types of optical discs in that order, the present invention should not be limited as such. In other embodiments of the present invention, the tracking error signal and the RECD signal or the total RF level signal can be separately used for type determination of DVD or at least two of the three signals can be used for type determination of DVD in any order. The only difference between these embodiments is that the determination is more accurate, with more types of signals used. Finally, the results of type determination may slightly differ when identical signals are used but in different order.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of determining a type of a digital versatile disc, comprising:

reading a tracking error signal from the digital versatile disc;

determining if the digital versatile disc is a recordable digital versatile disc according to the tracking error signal;

reading a recorded area (RECD) signal from the digital versatile disc; and determining if the digital versatile disc is a blank re-writable digital versatile disc according to the RECD signal, wherein the RECD signal is generated through analyzing an RF level signal from the digital versatile disc, and wherein, if the RF level signal is greater than a predetermined value, then the RECD signal is set to 'high' or '1'; otherwise, the RECD signal is set to 'low' or '0'.

2. The method of claim 1, further comprising:

if an amplitude of the tracking error signal is greater than a first predetermined value, determining the digital versatile disc as a recordable digital versatile disc.

3. The method of claim 1, wherein the tracking error signal is generated through a differential push-pull method.

4. The method of claim 1, wherein the tracking error signal is generated through a differential phase detection method.

5. The method of claim 1, further comprising:

if the RECD signal is approximately equal to zero, determining the digital versatile disc as a blank re-writable digital versatile disc.

6. The method of claim 1, further comprising:

reading a total RF level signal from the digital versatile disc; and determining whether the digital versatile disc is a re-writable digital versatile disc with data or a read-only-memory digital versatile disc according to the total RF level signal.

7. The method of claim 6, further comprising:

if the total RF level signal is greater than a second predetermined value, determining the digital versatile disc as a read-only-memory digital versatile disc; otherwise, determining the digital versatile disc as a re-writable digital versatile disc with data.

8. The method of claim 6, wherein the total RF level signal is the sum of at least a signal obtained from the digital versatile disc through an optical pick-up head.

9. The method of claim 1, wherein the determining if the digital versatile disc is a recordable digital versatile disc is based on an amplitude of the tracking error signal.

10. A method of determining a type of a digital versatile disc, comprising:

reading a recorded area (RECD) signal from a digital versatile disc; and determining if the digital versatile disc is a blank re-writable digital versatile disc according to an amplitude of the RECD signal, wherein the RECD signal is generated through an analysis of an RF level signal obtained from the digital versatile disc, wherein, if the RF level signal is greater than a predetermined value, the RECD signal is set to 'high'; otherwise, the RECD signal is set to 'low'.

11. The method of claim 10, wherein the digital versatile disc is determined as a blank re-writable digital versatile disc if the RECD signal is approximately equal to zero.

12. A method of determining a type of a digital versatile disc, comprising:

reading a recorded area (RECD) signal from the digital versatile disc;

determining an RF signal level from the digital versatile disc;

setting the RECD signal as 'high' if the RF level signal is greater than a predetermined value;

selling the RECD signal as 'low' if the RF level signal is less than or equal to the predetermined value; and determining whether the digital versatile disc is a blank re-writable digital versatile disc according to the set RECD signal.

13. The method of claim 12, further comprising:

determining whether the digital versatile disc is a re-writable digital versatile disc with data or a read-only-memory digital versatile disc according to the RF level signal.

14. The method of claim 12, further comprising:

reading a tracking error signal from the digital versatile disc; and determining if the digital versatile disc is a recordable digital versatile disc according to the tracking error signal.

* * * * *

UNITED STATES PATENT AND TRADEMARK OFFICE

CERTIFICATE OF CORRECTION

PATENT NO. : 7,570,561 B2
APPLICATION NO. : 11/078221
DATED : August 4, 2009
INVENTOR(S) : Tai It is certified that error appears in the above-identified patent and that said Letters Patent is hereby corrected as shown below:

On the Title page,

[*J Notice: Subject to any disclaimer, the term of this patent is extended or adjusted under 35 USC 154(b) by 609 days.

Delete the phrase "by 609 days" and insert -- by 1065 days --

Signed and Sealed this

Fifteenth Day of June, 2010

David J. Kappos
*Director of the United States Patent and Trademark Office*